United States Patent Office 2,794,659
Patented June 4, 1957

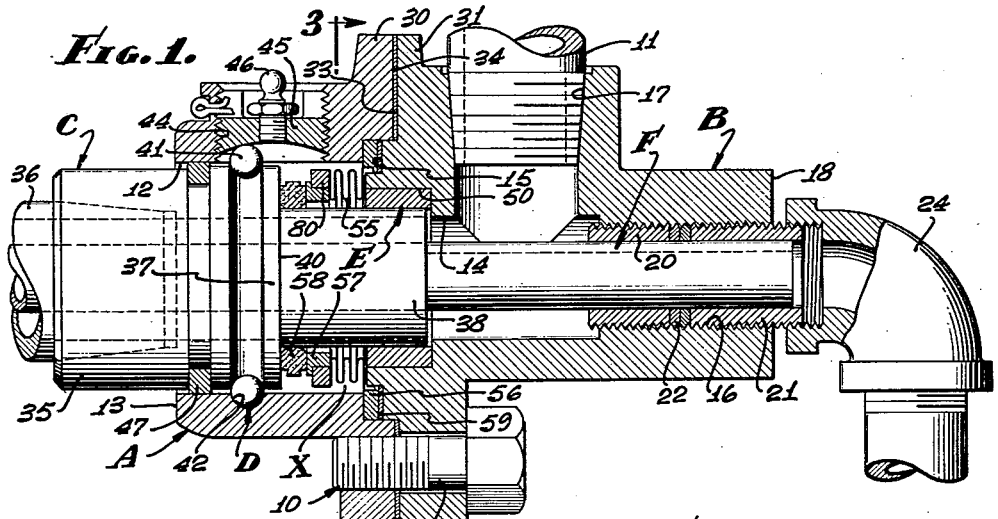

2,794,659

FLUID HANDLING SWIVEL FOR CALENDER ROLLS OR THE LIKE AND SEALS THEREFOR

Peter J. Bily, Brea, Calif., assignor to Chiksan Company, Brea, Calif., a corporation of California Application July 29, 1954, Serial No. 446,472

8 Claims. (Cl. 285—134)

This invention is concerned with a fluid handling swivel joint for calender rolls, or the like, and it is a general object of the invention to provide a construction for use in connection with calender rolls, or like devices, and which effectively handles fluids, such, for example, as steam and condensate.

This application is a continuation-in-part of my co-pending applications for Letters Patents entitled Swivel for Calender Rolls, Or the Like and Fluid Handling Joint and Seal Therefor, Serial Nos. 64,492, now abandoned, and 92,281, now abandoned respectively.

It is a general object of the present invention to provide a structure involving, generally, a body rotatably supporting a nipple, or like element, provided for supplying a calender roll, or the like, and including packing means maintaining sealed engagement with the nipple or between the nipple and the body as the structure operates.

A general object of this invention is to provide a joint of the general character referred to, wherein, one of the elements is sectional and has its sections holding the sleeve of a sealing means by a clamping action.

It is a general object of the present invention to provide a construction involving a body carrying a nipple so that it is free to rotate and is supported so that it is effectively related to a roll, or the like, which structure includes a packing of simple form and construction and which is highly effective under severe operating conditions such, for example, as high temperatures incidental to the handling of steam or like fluids.

It is another object of this invention to provide a structure of the general character referred to wherein the body is sectional, enabling the sealing unit carried in the body to be removed and replaced as circumstances require, with a minimum of effort and without disturbing elements connected with the rolls, or the like.

It is another object of this invention to provide a joint of the general character referred to wherein, the seal between the sections involves a sealing ring cooperatively related to a bellows type seal, which seal is free or full floating.

It is still another object of the invention to provide a seal for a joint of the general character referred to wherein mounting rings are fixed on the ends of a bellows type sleeve, one of the rings projecting radially or outwardly beyond the sleeve to be accessible for application to a joint element, and the other serving to hold a seat ring having a face cooperatively engaged by a sealing ring.

It is a further object of the invention to provide a seal for a joint of the general character referred to wherein a mounting ring is fixed on one end of a bellows type sleeve to project radially or outwardly beyond the sleeve to be accessible for application to a joint element, and a seal wherein a sealing ring is fixed on the other end of the bellows type sleeve to project therefrom to engage another relatively movable joint element.

A further object of the invention is to provide a seal of the general character referred to characterized by a sealing ring acting between opposed relatively moving faces, which ring is free of the elements having the seat faces so that it can move or rotate relative to either or both of them.

A further object of the invention is to provide a structure of the general character referred to including a simple, inexpensive, compact arrangement and combination of parts which serves to provide an effective, dependable, practical and inexpensive manufacture.

The various objects and features of my invention will be fully understood from the following detailed description of typical preferred forms and applications of the invention, throughout which description reference is made to the accompanying drawings, in which:

Fig. 1 is a longitudinal detailed sectional view of the swivel joint embodying the present invention.

Fig. 2 is an enlarged detailed longitudinal sectional view of a portion of the structure illustrated in Fig. 1.

Fig. 3 is an enlarged, detailed sectional view of a portion of the structure, being a view taken as indicated by line 3—3 on Fig. 2; and, Fig. 4 is an enlarged detailed sectional view similar to Fig. 2 and showing a modified form of seal construction.

The construction provided by the present invention involves features applicable, generally, to swivel joints or swivel connections. However, since it is particularly practical and advantageous as applied to structures for use in connection with calender rolls, or the like, where fluids are to be fed to and drained from the rolls, I have elected to illustrate forms and applications of the invention especially designed for this particular application.

The joint structure illustrated in the drawings involves, generally, a unitary body which is sectional in form and which preferably includes a final or socket section A and a head section B, a rotary male element or nipple C engageable with the body to support the body or to be carried by the body, means D rotatably coupling the nipple and body and forming a bearing between these parts, an inner bearing E supporting the nipple in the body, a fluid conducting tube F engaged through the body and extending through the nipple, sealing means G acting between the body and the nipple, and various other parts and features of construction all of which will appear from the drawings and the following description.

The body formed by the elements A and B is unitary and is preferably of sectional construction and involves but two sections, namely the female or socket section A and the head section B. In accordance with the present invention the body sections are releasably joined or coupled by suitable means such as a connecting means 10, and in the case illustrated the body forms a structure that handles the tube F, receives a fluid supply line 11, or the like, and which is supported by or supports the nipple C, the packing means G and the other elements of the structure.

The socket section A is an elongate element and has a socket opening 12 entering it from its outer end 13, and in the particular construction shown the socket opening 12 extends entirely through the section A from one end to the other.

The head section B has a fluid handling passage or opening 14 formed in it from its inner end 15 which end opposes and is joined to the section A to establish a bottom for the socket opening therein. In the case illustrated the head section B has angularly related openings 16 and 17 handling elements such as the tube F and supply line 11. The opening 16 which handles or accommodates the tube F, is an axially disposed opening formed in the section B from its outer end 18 to a point where it joins the flow passage 14, the passage 14 being substantially larger in diameter than the opening 16, as clearly shown in Fig. 1 of the drawings. The opening 17 which handles or accommodates the supply line 11 is a laterally disposed opening extending into the body section B from one side and communicating with the inner end portion of the flow passage 14.

In a typical situation where the structure is supported by and is handling flow in connection with a calender roll 36, or the like, fluid such as steam may be introduced into the structure through the pipe 11 and the tube F which extends through opening 16 may be provided to handle condensate so that it is drained through the structure.

In the particular case illustrated the tube F is suitably supported and is sealed where it passes through the opening 16. In the drawings the opening 16, which is considerably larger in diameter than the tube F, has tube supports 20 and 21 threaded into it from its inner and outer ends, respectively, and packing 22 is provided around the tube within the opening 16 and between the inner ends of the supports 20 and 21. In the particular case illustrated the tube F terminates at support 21 and the support 21 is in the form of a coupling or nipple projecting a substantial distance from the end 18 of body section B so that it may carry a suitable fitting such as an elbow 24, or the like.

The means 10 releasably coupling the sections A and B joins the inner ends of the sections with the socket 12 aligned with the flow conducting passage 14. In the particular case illustrated the means 10 is a flange connection involving radially projecting flanges 30 and 31 on the sections A and B, respectively, the flanges being joined by suitable screw fasteners 32. In the particular case illustrated the inner end of section B is recessed at 33 and receives the inner end portion of section A so that the sections are meshed or lapped together and thus maintained in proper alignment. In practice, a suitable gasket 34 is provided between the flanges 30 and 31 to assure a fluid tight connection when the sections A and B are engaged.

The rotating nipple C is shown as a simple tubular part with an outer end portion 35 projecting from the body to connect with an element 36 such as a calender roll, or the like, so that the nipple is supported thereby and with an inner end portion 37 extending into the body. The inner end portion 37 of the nipple C fits the socket 12 with working clearance and extends a substantial distance into the socket to a point where it is materially reduced in diameter, leaving a reduced extension 38 projecting from the nipple or from that portion of the nipple in the socket 12 into the section B where it is engaged in the inner bearing E. The nipple has a flat, smooth finished face or shoulder 40 where the portion engaged in the socket opening 12 joins the reduced extension 28, which shoulder is in a plane normal to the axis of the structure and is spaced a substantial distance from the inner end 15 of section B so that there is a chamber X established in the structure between the sections A and B to carry the sealing means G.

The means D rotatably coupling the nipple C with the body and providing a bearing support between the nipple and the body is preferably an anti-friction means and is shown as involving an annular series of balls 41 carried in registering grooves 42 in the wall of the socket 12 and the wall of the inner end portion 37 of the nipple which fits within the socket with working clearance. The balls are arranged in place and are removed from the structure through a lateral access opening 44 formed in section A and communicating with the socket where the groove 42 occurs. The opening 44 is normally closed by a suitable closure or plug 45 which preferably carries a lubricant fitting 46.

In the particular case illustrated a lubricant or grease cell 47 is provided between the nipple and the socket outward of the means D, as clearly shown in Fig. 1 of the drawings.

The inner bearing E is provided to engage the reduced tubular extension 38 of the nipple to provide support between the body and the nipple and in the preferred construction the bearing E is supported in a counterbore 50 provided in the section B which counterbore preferably enters the section B from the inner end 15 thereof. The inner bearing E is shown as a simple sleeve type bearing tight in the counterbore 50 and rotatably engaging the inner end portion of extension 38. Through this construction the body and the nipple C are effectively supported at axially spaced points, that is, at the means D and at the means E, and the sealing means G is located around the extension and between the supports.

The preferred form of sealing means G provided by the present invention and illustrated in Figs. 1 to 3 of the drawings, preferably involves, generally, a resilient bellows type sleeve 55 surrounding the extension 38 and located in the chamber X between the sections A and B as above described, an outer or large mounting ring 56 by which the sleeve 55 is mounted in the body between the inner opposed ends of the sections A and B, a seat ring 57 on or carried by the sleeve 55 and a sealing ring 58 acting and sealing between the flat shoulder 40 on the nipple C and a flat seat face 59 which is provided on the seat ring 57.

The bellows 55 of the sealing means G is an annular or tubular element preferably formed of thin walled resilient material, such as a suitable metal, and involves a plurality of annular flat disc-like parts 60 spaced apart axially and joined by alternate inner and outer curved connecting parts 61 and 62 so that it is corregated or zigzagged, as clearly shown in Fig. 2 of the drawings. In the case illustrated, the bellows 55 is shown as provided with axially projecting end flanges 66 and 67 projecting from the outer peripheral edges of each end disc 60.

The flange 67 at one end of the sleeve 55 carries or is connected with the large mounting ring 56, it being preferred that the flange 67 be engaged within the mounting ring 56 so that the ring projects radially outward a substantial distance from the sleeve.

The mounting ring 56 is preferably permanently, tightly joined with the flange 67 of the sleeve as by soldering, or the like. In the preferred arrangement, the large mounting ring 56 is engaged in a counterbore 75 entering the body section A from its inner end and terminating at a flat shoulder 76. The inner end 15 of the section B, radially inward of the recessed portion 33, enters the socket 75 so that the mounting ring 56 is clamped between the inner end 15 of the head section B and a flat shoulder 76 in the section A. In practice, a suitable seal or gasket 59 may be provided to establish a fluid tight connection or joint where the mounting ring 56 is held. The gasket 59 is shown arranged between the ring 56 and the end 15 of the section B.

In the form of the invention illustrated, the seat ring 57 is suitably joined to or mounted on the end of the sleeve 55 which faces and opposes the shoulder 40 of the nipple C, the mounting of the seat may be established through a small mounting ring 80 which is fixed to the sleeve 55 by means of the flange 66. The small mounting ring 80 is shown engaged within the flange 66 and against the adjacent end disc 60 of the bellows sleeve 55 and it may be fixed or sealed with the sleeve 55 by means of soldering, welding, or the like. The small mounting ring 80 is preferably formed of a metal that can be advantageously, permanently fixed to the bellows 55 by soldering or welding and will not become permanently damaged by the heat incurred during such operation and a metal that can be advantageously dressed or finished after it has been fixed to the bellows.

The seat ring 57 is a simple annular part that is formed of high grade bearing material suitable for providing the flat, smooth seat face 59 thereon. In the case illustrated the seat ring 57 is shown as tightly engaged or pressed into the small mounting ring 80 and against the inner peripheral portion of the related end disc 60 of the bellows sleeve 55. The face 59 on the seat ring 57 is preferably a flat, smooth, hardened face occurring in a plane normal to the axis of the structure.

The sealing ring 58 is a simple annular element or ring with a flat, smooth sealing face 82 at one end engaged with or seated on the face 59 of the seat ring 57, and with a flat, smooth sealing face 83 at the other end engaged with or seated on the shoulder 40 of the nipple C. In practice, the sealing ring 58 may be formed of any suitable material, however, for high pressure and high temperature service and where the structure is subject to more or less constant operation or rotation, it is advantageous to form the ring 58 of carbon or carboniferous composition so that the faces 82 and 83 may be finished so that they are true and smooth and establish satisfactory sealing engagement with the sealing face 59 and the shoulder 40. It is to be observed that the ring 58 surrounds the extension 37 so that it can turn or rotate thereon and it is full floating, that is, it is free to move relative to either the nipple C or to the seat ring 57, or both. In practice, the parts are proportioned so that the bellows type sleeve 55 is somewhat compressed when in operating position, as shown in the drawings, so that suitable, axial pressure is exerted on the sealing ring holding the sealing surfaces in proper sealing engagement. It is also to be observed that fluid pressure within the chamber X, radially inward of the bellows sleeve 55 tends to expand the bellows longitudinally and holds the sealing surfaces in proper sealing engagement.

The nipple C is formed of high grade steel and the ball race 42 and shoulder 40 thereof are flame hardened to assure long and dependable service.

In Fig. 4 of the drawings, I have illustrated a modified form of sealing means G' adapted for use in fluid handling swivel joints of the general character referred to, which joints are not subject to continuous operation or rotation and in which the sealing ring need not be formed of carbon or other high quality, hardened, bearing material. For the purpose of illustration, I have shown the sealing means G' applied to the same joint construction illustrated in Figs. 1 to 3 of the drawings.

The sealing means G' is a unitary structure involving, generally, a resilient bellows sleeve 55', a sealing ring 58' and a mounting ring 56'. The bellows and sealing ring are located in the chamber X established between sections A and B of a swivel joint body, while the mounting ring 56' is engaged and held between the inner opposed ends of the sections A and B so that it is secured in place in the same or similar manner as is the mounting ring 56 in the first form of the invention.

The bellows 55' of the sealing means G' is an annular or tubular element formed of thin walled resilient material and involves a plurality of annular flat disc-shaped parts 60' spaced apart axially and joined by alternate inner and outer curved connecting parts 61' and 62', so that its corrugated or zig-zagged, as clearly shown in Fig. 4 of the drawings.

The sealing ring 58' is preferably formed of a sealing material that can be soldered, welded or otherwise fixed to the bellows sleeve 55' without damage thereto and such that it can be advantageously worked and dressed after application to the sleeve. The ring 58' is interposed between the bellows 55' and the shoulder 40 on the nipple C. In the particular case illustrated the ring has a flat end 82' against which an end disc 60' of the bellows is seated, and it has a step end opposing the shoulder 40 on the nipple C providing a limited sealing face 83' bearing against the shoulder 40 and establishing sealing engagement therewith. In the particular case illustrated the bellows is sealed tightly to or with the ring 58' by a flange 66' which projects from the inner peripheral portion of the disc 60' that seats against the ring, which flange 66' is tightly engaged in and sealed to the ring 58'.

The mounting ring 56' is located at the end of the bellows 55' opposite to that at which the sealing ring 58' is located. The mounting ring 56' is identical to the large mounting ring 56 in the first form of the invention and is related to the bellows 55' and to the body sections A and B in the same manner as the ring 56 is related to the bellows 55 and body sections A and B in the first form of the invention. That is, the mounting ring 56' projects radially outward from a flange 67' on the bellows sleeve 55' and is held in tight clamped engagement between the body sections A and B. The flange 67' projects longitudinally from the outer peripheral edge of its sealed bellows disc 60' and is fixed to the inner periphery of the ring 56' as by soldering or the like.

From the foregoing description, it will be apparent that the invention has provided a structure which is simple, practical, and effective in construction and it will be apparent that the structure readily permits the sealing means G or G' to be removed and replaced by simple separation of the body sections, all of which may be done without disturbing the connection with the element 36 with which the structure is associated. In a typical application of the invention the rotary nipple C may be connected with and supported by a calender roll supplied with steam, or the like, through the supply pipe 11 while condensate is drained from the roll or other elements through the tube F to be discharged through fitting 24. The axially spaced bearing supports provided by the means D and E effectively maintain the nipple C in proper axial alignment with the body. However, should there be play or looseness between the parts either axially or radially, the bellows of the sealing means G or G' compensate for the looseness or movement and the structure operates without leakage. It is to be understood that the bellows sleeves 55 and 55' are so constructed and proportioned as to normally be under compression, so that the sealing rings 58 and 58' are normally held in suitable pressure engagement with the shoulder 40 so that the desired seal is maintained at all times.

Having described only typical preferred forms and applications of my invention I do not wish to be limited or restricted to the specific details herein set forth, but wish to reserve to myself any variations or modifications that may appear to those skilled in the art and fall within the scope of the following claims.

Having described my invention, I claim:

1. A fluid handling joint structure of the character described including, an elongate tubular flow handling body having separable elongate sections arranged end to end, the sections having opposed abutting end parts, clamp means releasably securing the said end parts together, one section having a socket therein entering it from its outer end and the other having pipe coupling means at its outer end for fixing a pipe thereto, an elongate tubular flow handling nipple extending into the socket from the outer end of the first mentioned section to support the body and having an end face opposing and spaced from the bottom of the socket, anti-friction bearing means in the socket coupling the nipple and body together for relative rotation, an elongate tubular extension on the nipple extending longitudinally in the body from the said end face of the nipple to a point axially removed from said anti-friction bearing means and where it has rotational bearing engagement in the said other section of the body inward of the socket, and resilient bellows type sealing means in the socket located around said extension and sealing between the body and said face of the nipple.

2. A fluid handling joint structure of the character described including, an elongate tubular flow handling body having separable elongate sections with opposed abutting inner end parts, one section having a socket therein entering it from its outer end, the inner end part of the other section forming the bottom of the socket, an elongate tubular flow handling nipple extending into the socket from said outer end of said section and having a flat inner end face spaced from and facing the bottom of the socket and an outer end engageable with a fluid handling element to be supported thereby, bearing means in the socket coupling the nipple and body against separation and for relative rotation, and sealing means in the socket including a bellows under compression longitudinally of the joint structure, a sealing ring fixed to and carried by the bellows and having sliding sealing engagement with the said end face of the nipple and a mounting ring fixed to and carried by the bellows and confined tightly between the said inner end parts of the sections of the body, the nipple having an elongate extension of reduced diameter projecting from said end thereof and extending through the sealing means from one end to the other thereof and into the said other section of the body to have bearing engagement therewith.

3. A fluid handling joint structure of the character described including, an elongate tubular flow handling body having abutting elongate sections arranged end to end with opposed inner end parts and means releasably connecting the sections in abutting engagement, one section having an opening through it forming a socket in said section, the other section closing the inner end of the said socket, an elongate tubular flow handling nipple having an outer end portion engageable with a fluid handling element to support and carry the joint structure and an inner end portion extending into the socket, means in the socket coupling the nipple and the first mentioned body section against separation and for relative rotation and including an anti-friction bearing supporting the body on the nipple, a bearing in said other section and axially removed from said means, an elongate tubular flow handling extension on the inner end portion of the nipple and rotatably engaged in the last mentioned bearing, and sealing means in the socket including a bellows under compression longitudinally of the joint, a sealing ring carried by the bellows and having sliding sealing engagement with the inner end portion of the nipple and a mounting ring fixed to and carried by the bellows and clamped by and between the said opposed inner end parts of the sections of the body.

4. A fluid handling joint structure of the character described including an elongate fluid handling body having two separable elongate sections with opposed abutting inner end parts, one section having a socket therein entering it from its outer end and the other section having a part establishing a bottom for the socket and having an axial socket opening carrying a bushing, an elongate tubular fluid handling nipple extending into the socket from said outer end of the first mentioned section and having a flat end face in the socket facing the bottom of the socket and having an elongate tubular fluid handling extension projecting from said end face and extending through the socket and into the bushing and rotatably supported therein, means in the socket coupling the nipple and body against separation and for relative rotation, and sealing means in the socket including an elongate tubular bellows, a sealing ring at one end thereof and having sliding sealing engagement with the said face of the nipple and a mounting ring fixed to and projecting radially outward from the bellows at the other end thereof and engaged by and confined between the said inner end parts of the sections of the body.

5. A fluid handling joint of the character described including, a tubular flow handling body having a female section with a socket extending therethrough, a head section with a flow passage coaxial with the socket and smaller in diameter than the socket, the said sections having opposed inner end parts, the body having a lateral flow handling opening communicating with the passage and an end opening coaxial with the socket and joining the passage, means releasably connecting the said inner end parts of the sections together, a flow handling nipple entering the socket and having a shoulder in the socket and facing the head section, means rotatably coupling the nipple and female section against separation, a bearing in the head section axially removed from the socket, the nipple having an extension smaller in outside diameter than the nipple and rotatably supported in the bearing, and sealing means including bellows under compression in the socket between the shoulder and the head section, a sealing ring at one end of the bellows fixed thereto and slidably engaging said shoulder, and a mounting ring at the other end of the bellows fixed thereto and engaged by and clamped between the said inner end parts of the body sections.

6. A fluid handling joint of the character described including, a tubular flow handling body having a female section with an axial opening forming a socket therein, a head section abutting the female section and having a part forming a bottom for the socket and having an opening in said part forming a counterbore continuing in the body from the bottom of the socket concentric with the socket and smaller in diameter than the socket and counterbore and having a lateral opening communicating with the passage and an end opening joining the passage and concentric therewith, means releasably connecting the sections together, a nipple entering the socket and having a shoulder thereon facing the head section and spaced therefrom, anti-friction bearing means rotatably coupling the nipple and female section, a bearing in the counterbore, the nipple having an extension supported in the bearing, and sealing means including bellows under compression in the socket between the shoulder and the bottom of the socket and surrounding the extension of the nipple, a sealing ring at one end of the bellows slidably engaging said shoulder, and a mounting ring at the other end of the bellows and held tight between the body sections.

7. A fluid handling swivel joint including, an elongate body having a longitudinal flow passage extending therethrough, a bore entering the body from one end and defining a socket in said element, said body having a reduced counterbore continuing inward from the bottom of said bore, the bore and counterbore being coaxial with said longitudinal flow passage, an elongate nipple with a longitudinal flow passage extending therethrough and having an inner end portion entering said socket from said one end of the body, said inner end portion of the nipple having a flat shoulder located in said socket and spaced from and opposing the bottom of said socket, the inner end portion of said nipple having a reduced extension projecting beyond said shoulder and entering the counterbore with the flow passage of the nipple being in open communication with the flow passage of the body, said body and nipple elements defining a closed chamber located in said socket inward of said shoulder on the nipple and surrounding said extension, there being registering grooves in the body and the nipple, an annular series of balls in the grooves coupling said body and nipple for relative rotation and against separation, a bushing in the counterbore receiving and rotatably supporting said extension on the nipple, said body including two sections and fastening means releasably connecting the sections together, one section having the bore therein and the other having the counterbore therein, and sealing means between said nipple and body including an elongate resilient bellows type sleeve located in said closed chamber and surrounding said extension, a mounting ring fixed on one end of said sleeve to project radially therefrom and held tight between said two sections of the body, a seat ring fixed on the other end of said sleeve and surrounding said extension on the pin portion, and a sealing ring surrounding said extension and having sliding sealing engagement with said seat ring and the shoulder on the nipple.

8. A fluid handling swivel joint including, an elongate body with a central longitudinal flow passage extending therethrough and having a bore entering said element from one end defining a socket in said body, the element having a reduced counterbore continuing inward from the bottom of said socket, an elongate nipple with a central longitudinal flow passage extending therethrough and having an inner end portion entering said socket from said one end of said female element, said nipple having a flat sealing shoulder located in said socket and spaced from and opposing the bottom of said socket the inner end portion of said nipple having a reduced extension projecting beyond said shoulder and entering the counterbore, said nipple and body defining a closed chamber located in said socket inward of the shoulder on the nipple and surrounding said extension, there being registering grooves in the socket in the body and on the inner end portion of the nipple, an annular series of balls in the grooves coupling said body and nipple for relative rotation and against separation, a bushing in the counterbore receiving and rotatably supporting said extension, said body element including two sections and fastening means releasably connecting the sections together, one section having the bore therein and the other having the counterbore therein, and sealing means between said nipple and body including an elongate resilient bellows type sleeve located within said closed chamber and surrounding said extension, a mounting ring fixed on one end of said sleeve and held between said two sections of the body, a seat ring fixed on the other end of said sleeve and surrounding said extension, and a carbon sealing ring surrounding said extension and having flat parallel end faces, one having sliding sealing engagement with said seat ring and the other having sliding sealing engagement with the shoulder of said end portion of the nipple.

References Cited in the file of this patent

UNITED STATES PATENTS

| | | |
|---|---|---|
| 2,038,855 | Rosenblad | Apr. 28, 1936 |
| 2,192,426 | Ames | Mar. 5, 1940 |
| 2,249,930 | Bailey et al. | July 22, 1941 |
| 2,424,969 | Carpenter | Aug. 5, 1947 |